Aug. 26, 1924.
C. C. FARMER
VARIABLE LOAD BRAKE
Filed Sept. 27, 1923
1,505,950
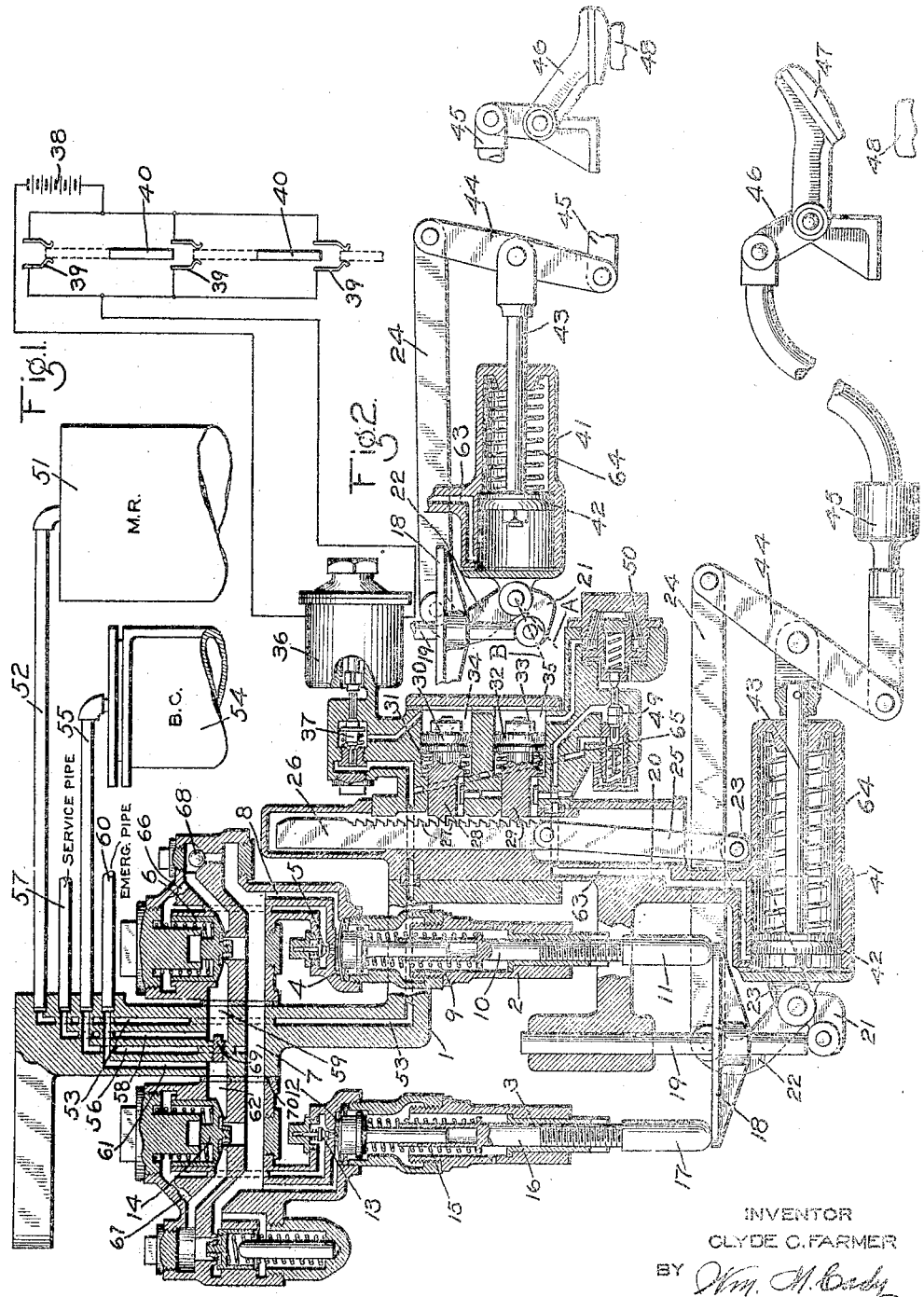
INVENTOR
CLYDE C. FARMER
BY Wm. A. Cody
ATTORNEY Patented Aug. 26, 1924.

1,505,950

UNITED STATES PATENT OFFICE.

CLYDE C. FARMER, OF PITTSBURGH, PENNSYLVANIA, ASSIGNOR TO THE WESTING-HOUSE AIR BRAKE COMPANY, OF WILMERDING, PENNSYLVANIA, A CORPORATION OF PENNSYLVANIA.

VARIABLE-LOAD BRAKE.

Application filed September 27, 1923. Serial No. 665,110.

*To all whom it may concern:*

Be it known that I, CLYDE C. FARMER, a citizen of the United States, residing at Pittsburgh, in the county of Allegheny and State of Pennsylvania, have invented new and useful Improvements in Variable-Load Brakes, of which the following is a specification.

This invention relates to fluid pressure brakes, and more particularly to a variable load brake.

The present construction is similar in many respects to the construction shown in the prior patent of Walter V. Turner, No. 1,265,001, dated May 7, 1918, and the pending application of Edward H. Dewson, Serial No. 615,011, filed January 26, 1923.

The principal object of my invention is to provide an improved and simplified variable load brake equipment of the character disclosed in the above mentioned patent and patent application.

In the accompanying drawing; Fig. 1 is a diagrammatic view, mainly in section, of a variable load brake mechanism embodying my invention; and Fig. 2 a fragmentary view of a portion of the mechanism shown in Fig. 1, showing the positions to which certain parts are moved when the strut cylinder is supplied with fluid under pressure.

The mechanism shown in the drawing comprises a casing 1 associated with which is a service brake cylinder pressure limiting valve device 2 and an emergency brake cylinder pressure limiting valve device 3. The valve device 2 comprises a flexible diaphragm 4 for operating a valve 5 which controls the operation of a service brake cylinder supply valve 6. The diaphragm 4 is subject on one side to brake cylinder pressure as supplied from chamber 7 through passage 8 and is subject on the opposite side to the pressure of an adjustable coil spring 9.

The adjustment of spring 9 is effected through the movement of a plunger 10 having on its lower end a cap nut 11.

The emergency limiting valve device 3 is similar to the valve device 2 and comprises a flexible diaphragm 12 for operating a valve 13 which in turn controls the operation of an emergency brake cylinder supply valve 14. The diaphragm 12 is subject on one side to the pressure of spring 15, the pressure of which is adjusted by the movement of a plunger 16 having a cap nut 17.

The cap nuts 11 and 17 engage a plate 18 secured to a slidable guide rod 19. Pivotally mounted on a portion of the latch bracket 20 adjacent to plate 18 is a crank arm member having crank arms 21, 22, and 23. The crank arm 21 is adapted to engage the lower end of rod 19 and the crank arm 22 is pivotally connected to a link 24. The crank arm 23 is connected through a link 25 with a ratchet bar 26 which is slidably mounted in the latch bracket casing 20.

The teeth 27 of bar 26 are engageable by pawls 28 and 29, so spaced that when one pawl engages a tooth of the ratchet bar, the other pawl will be in a mid position between successive teeth of the bar. The pawl 28 is connected to a piston 30, subject on one side to the pressure of spring 31 and pawl 29 is connected to piston 32, subject on one side to the pressure of spring 33.

The pistons 30 and 32 are contained in connected piston chambers 34 and 35 and fluid pressure for operating said pistons is supplied by operation of a magnet valve device comprising a magnet 36 and a double beat valve 37. The coil of magnet 36 is connected in a circuit which includes a source of current 38 and a plurality of switches 39, each switch being controlled by a corresponding car door 40.

Forming part of the latch bracket casing 20 is a strut cylinder 41 containing a piston 42, piston rod 43 of which is pivotally connected to a lever 44. One end of lever 44 is pivotally connected to the link 24 and the other end is connected to a push rod 45. Pivotally connected to the outer end of rod 45 is a bell crank 46 which is pivotally mounted on the car body. The free arm of the bell crank 46 is provided with a member 47 adapted to engage a knife edge member 48 which is mounted at a convenient location on the car truck.

The fluid pressure on piston 42 is controlled by a double beat valve 49 and the operation of the double beat valve is controlled by a piston 50, one side of which is in constant communication with piston chamber 35.

The main reservoir or other source of fluid under pressure 51 is connected by a pipe 52 to a passage 53, leading to the double beat valve 37. The brake cylinder 54 is connected by pipe 55 and passage 56 to chamber 7. Pipe 57, through which fluid is supplied to the brake cylinder to effect a service application of the brakes is connected to a passage 58, leading to chamber 59, the pressure of which acts on the under face of valve 6. Pipe 60, through which fluid is supplied to effect an emergency application of the brakes is connected to a passage 61 which leads to a chamber 62, the pressure in which acts on the under face of valve 14.

In operation, when a car equipped with the above described variable load brake apparatus is running along the road with all the car doors 40 closed, as shown in full lines in Fig. 1, the switches 39 will be open, so that the magnet 36 will be deenergized. With magnet 36 deenergized, the double beat valve 37 will be in the position shown in Fig. 1, in which communication is open for supplying fluid under pressure from the main reservoir 51, through pipe 52 and passage 53 to piston chambers 34 and 35. The pistons 30 and 32 are therefore operated to hold the pawls 28 and 29 in engagement with the teeth 27 of the ratchet bar 26.

Fluid pressure in piston chamber 35 is also supplied to piston 50, so that the double beat valve 49 is held in the position shown in Fig. 1, in which the piston 42 is connected through passage 63 with the atmosphere. Spring 64 then acts to hold piston 42 in its retracted position so that the member 47 does not engage the knife edge 48. Movement of the car truck will therefore not be transmitted to the variable load brake mechanism while the car is running.

When the car is brought to a stop and one or more of the car doors 40 are opened, the circuit of magnet 36 will be closed through the switches 39, as shown in dotted lines. The energization of magnet 36 then effects the movement of the double beat valve 37 so as to cut off communication through which fluid under pressure is supplied to piston chambers 34 and 35 and open communication from said piston chambers to the atmosphere.

The venting of fluid pressure from the piston chambers 34 and 35 permits the springs 31 and 33 to shift the pistons outwardly, thus releasing the pawls 28 and 29 from engagement with the teeth of rack bar 26, so that said bar is free to slide.

When fluid is vented from piston chambers 34 and 35, fluid is also vented from piston 50, so that the double beat valve 49 is operated to cut off the atmospheric vent from passage 63 and open communication from the main reservoir through passage 65 to passage 63. Fluid under pressure is then admitted to piston 42, so as to shift the same to the position shown in Fig. 2. In this movement, the strut 45 first operates the bell crank 46 so as to bring the member 47 into engagement with the knife edge 48.

If the load on the car is now increased by passengers entering the car, the downward movement of the car body, which carries the bell crank 46, relative to the car truck, causes a counter-clock-wise movement of the bell crank 46, so that pressure is exerted through the strut 45 to turn the lever 44 in a clock-wise direction. The link 24 then acts to rotate the crank arm 22 so as to rock the crank arm 21, say from position A to position B. This causes an upper movement of the rod 19 and the plate 18, so that the plungers 10 and 16 are moved upwardly to further compress the springs 9 and 15. By this means the pressure of the springs 9 and 15 on the corresponding diaphragms 4 and 12 is increased according to the load on the car. The movement of the link 24 as above referred to also effects the rotation of the crank arm 23, so that the link 25 is operated to shift the ratchet bar 26 to a position corresponding with the adjusted position of plate 18.

When the car is about to start and the car doors 40 are all closed, the magnet 36 will be deenergized and the double beat valve 37 will be operated to cut off the atmospheric vent from piston chambers 34 and 35 and to open communication for supplying fluid under pressure to said piston chambers. The pawls 28 and 29 are then operated by pistons 30 and 32 so as to cause the pawls to engage the teeth of the ratchet bar 26 and thus lock said bar against movement and consequently the plungers 10 and 16 will be locked in their adjusted positions.

When fluid under pressure is supplied to piston chambers 34 and 35, fluid is also supplied to piston 50, so that said piston operates the double beat valve 49 to open passage 63 to the atmosphere.

The piston 42 is then shifted to its retracted position, in which the bell crank 46 operates to move the member 47 out of engagement with the knife edge 48.

If the brakes are operated to effect a service application of the brakes, fluid under pressure will be supplied to the brake cylinder 54 through pipe 57. From pipe 57, fluid flows through passage 58 to chamber 59 and acts on the exposed area of valve piston 6. Said valve piston is then unseated, permitting flow of fluid to chamber 7 which communicates with the brake cylinder 54 through passage 56 and pipe 55.

The pressure of fluid supplied to the brake cylinder is also admitted through passage 8 to diaphragm 4 and when the pressure in the brake cylinder has been increased to a predetermined degree, corresponding with the previous adjustment of spring 9 in accordance with the load on the car, the diaphragm will be moved, permitting the valve 5 to close. Any further increase in pressure supplied to chamber 59 then flows through passage 66 to the spring side of valve piston 6, and since the pressure supplied thereto cannot now equalize past the valve 3 to the somewhat lower pressure in the brake cylinder the valve piston 4 will be moved to its seat, cutting off the further supply of fluid to the brake cylinder.

If an emergency application of the brakes is effected, fluid under pressure will be supplied to the brake cylinder through a pipe 60. From pipe 60 fluid flows through passage 61 to chamber 62 and acts on the exposed area of valve piston 14 to lift said valve piston from its seat.

When said valve piston is unseated fluid flows from chamber 62 to chamber 7 and thence to the brake cylinder 54.

The spring 15 of the emergency limiting valve device is so designed that a higher pressure is exerted on the diaphragm 12 for a given movement of plate 18 than is exerted by the service spring 9 and consequently it will be evident that when an emergency application is made, the brake cylinder pressure may be built up to a higher degree before the diaphragm 12 will be operated thereby to permit the valve 13 to close.

When such higher pressure is attained, the valve 13 will close and the fluid pressures equalizing on opposite sides of the valve piston 14, said valve piston will be operated to cut off the further supply of fluid to the brake cylinder.

The brakes may be released after either a service or an emergency application of the brakes by flow from chamber 7 past the check valve 68 to chamber 59 and the service pipe 57.

It will be clear that the apparatus will operate in a similar manner when the load on the car is decreased to reduce the pressure of the springs 9 and 15, since in this case, the plate 18 will be permitted to move downwardly to correspond with the relative positions of the member 47 and the knife edge 48.

If desired, the emergency pressure limiting portion of the apparatus may be removed, so that the brake cylinder pressure is limited to the same degree either in service or emergency applications of the brakes.

For this purpose, the emergency limiting valve portion is removed at the gasket 70 and a cover plate (not shown) is applied to seal the chambers 62 and 7. A pipe plug 69 in the wall separating the chambers 62 and 59 is then removed, so that fluid supplied through pipe 60 in an emergency application of the brakes can flow to the service chamber 59.

Having now described my invention, what I claim as new and desire to secure by Letters Patent, is:—

1. In a load brake apparatus, the combination with a mechanism for limiting the braking power according to the load on the car, of fluid pressure means for rendering said mechanism operative by the load on the car, fluid pressure means for locking said mechanism in its adjusted position, a magnet, and valve means operated by said magnet for controlling the fluid pressure on both said means.

2. In a load brake apparatus, the combination with a mechanism for limiting the braking power according to the load on the car, of fluid pressure means for rendering said mechanism operative by the load on the car, fluid pressure means for locking said mechanism in its adjusted position, and a valve device operated by fluid pressure supplied to said locking means for controlling the fluid pressure on the other fluid pressure means.

3. In a load brake apparatus, the combination with a mechanism for limiting the braking power according to the load on the car, of fluid pressure means for rendering said mechanism operative by the load on the car, fluid pressure means for locking said mechanism in its adjusted position, a valve device operated by fluid pressure supplied to said locking means for controlling the fluid pressure on the other fluid pressure means, and electrically controlled means for controlling the fluid pressure on said locking means.

4. In a load brake apparatus, the combination with a mechanism for limiting the braking power according to the load on the car, of mechanical connecting members movable to a position for rendering said mechanism operative by the load on the car, a cylinder carried by said mechanism, and a piston in said cylinder for operating said mechanical connecting members.

5. In a load brake apparatus, the combination with a mechanism for limiting the braking power according to the load on the car, of a member movable with the car truck, a member movable with the car body, a cylinder fixed to said mechanism, and a piston in said cylinder operatively connected to said car body member and operated by fluid under pressure for moving said car body member into engagement with said car truck member.

6. The combination with a brake cylinder and a valve device adapted to be adjusted according to the load on the car for determining the maximum brake cylinder pressure, of means for adjusting said valve device comprising a lever operatively connected to said valve device, a piston operatively connected to said lever, a member movable with the car truck, and a member movable with the car body and operatively connected to said lever and movable to engage said car truck member.

In testimony whereof I have hereunto set my hand.

CLYDE C. FARMER.